United States Patent [19]

Kuus

[11] Patent Number: 4,734,614
[45] Date of Patent: Mar. 29, 1988

[54] ELECTRIC LAMP PROVIDED WITH AN INTERFERENCE FILTER

[75] Inventor: Gijsbert Kuus, Turnhout, Belgium

[73] Assignee: U.S. Philips Corporation, New York, N.Y.

[21] Appl. No.: 871,033

[22] Filed: Jun. 5, 1986

[30] Foreign Application Priority Data

Jun. 11, 1985 [NL] Netherlands ............... 8501674

[51] Int. Cl.⁴ ................. H01J 5/08; H01K 1/32
[52] U.S. Cl. ........................... 313/112; 313/315
[58] Field of Search ............... 313/112, 113, 580, 315; 350/164, 166, 311

[56] References Cited

U.S. PATENT DOCUMENTS 3,962,062 6/1976 Ingrey ................. 350/311 X
4,652,789 3/1987 Kawakatsu et al. ........ 313/112

Primary Examiner—David K. Moore
Assistant Examiner—K. Wieder
Attorney, Agent, or Firm—Norman N. Spain

[57] ABSTRACT

The electric lamp according to the invention has a lamp vessel (1) of glass having an $SiO_2$ content of at least 95% by weight, in which an electric element (3) is arranged. The lamp vessel is coated with an interference filter (5) of alternating layers of $SiO_2$ and $Nb_2O_5$.

2 Claims, 2 Drawing Figures

ELECTRIC LAMP PROVIDED WITH AN INTERFERENCE FILTER

BACKGROUND OF THE INVENTION

The invention relates to an electric lamp comprising a glass lamp vessel sealed in a vacuum-tight manner and having an $SiO_2$ content of at least 95% by weight, current supply conductors extending through the wall of the lamp vessel to an electric element arranged in the lamp vessel and the lamp vessel being coated with an interference filter of alternative layers of mainly $SiO_2$ and of mainly metal oxide.

Such a lamp is known from British Patent Specification No. 2,103,830.

Due to the presence of an interference filter, the spectrum of the radiation emitted by the lamp is different from that in the absence of such a filter. The filter can be used in an incandescent lamp for reflecting infrared radiation so that thermal losses in the lamp are reduced and the lamp has a higher efficiency. Another possibility consists in having the filter reflect light of a given wavelength, as a result of which the lamp emits coloured light. The filter may also be used, for example, in metal halide discharge lamps, for example, for reflecting infrared radiation.

Incandescent lamps provided with an interference filter have long been known. For example, U.S. Pat. No. 4,017,758 shows and describes an incandescent lamp comprising a quartz glass lamp vessel which is enclosed by an outer bulb, while an interference filter is situated in the protective space between the lamp vessel and the outer bulb. However, the presence of an outer bulb is disadvantageous because it causes the generated light to be additionally reflected, as a result of which it can less readily be concentrated. Another disadvantage is that the outer bulb causes the lamp to become more voluminous, as a result of which luminaires of the lamp are more voluminous and the generated light can also be less readily concentrated.

The lamp disclosed in the aforementioned British Patent Specification No. 2,103,830 is an incandescent lamp which affords the advantage that the interference filter is present directly on the surface of the lamp vessel. Thus, an outer bulb as a carrier of the filter can be omitted. The interference filter consists of alternating layers of $SiO_2$ and of $Ta_2O_5$.

Silicon dioxide has a low refractive index and a high chemical and physical stability. This is evident from the use of glasses having a content of $SiO_2$ of 95% by weight or higher for the lamp vessel of halogen incandescent lamps and for discharge lamps. Tantalum pentoxide has a comparatively high refractive index (n=2.13). A disadvantage of $Ta_2O_5$, however, is its limited physical and chemical stability. Already after a thermal treatment at 800° C. for about 30 minutes, $Ta_2O_5$ in the filter has crystallizes to polycrystalline $\beta$-$Ta_2O_5$. This results in that the filter both scatters the transmitted light and reduces its capability to be concentrated and scatters the reflected radiation. If the filter is a filter reflecting infrared radiation, in an incandescent lamp less infrared radiation returns to the filament due to the diffuse reflection. Thus, this filter provides a smaller improvement in efficiency than would be the case without crystallization of the $Ta_2O_5$ layers.

Tantalum pentoxide further has the disadvantage that during operation of the lamp, in which it is used as a filter component, it produces mechanical stresses which leads to the formation of cracks in the filter. These cracks are visible as craquelé.

Another disadvantage is that $Ta_2O_5$ becomes grey at high temperatures, which leads to a reduced transparency. In the absence of oxygen, as in the outer bulb of a discharge lamp, greying occurs to a greater extent than in air. However, in a discharge lamp having an outer bulb it may also be of importance that an interference filter is directly situated on the lamp vessel (the discharge vessel) because radiation reflected by the filter is less frequently reflected before it returns to the discharge.

SUMMARY OF THE INVENTION

The invention has for its object to provide an electric lamp equipped with an interference filter, in which the interference filter has a high physical and chemical stability.

According to the invention, this object is achieved in a lamp of the kind mentioned in the opening paragraph in that the metal oxide is niobium pentoxide.

DETAILED DESCRIPTION OF THE INVENTION

Figure 1:
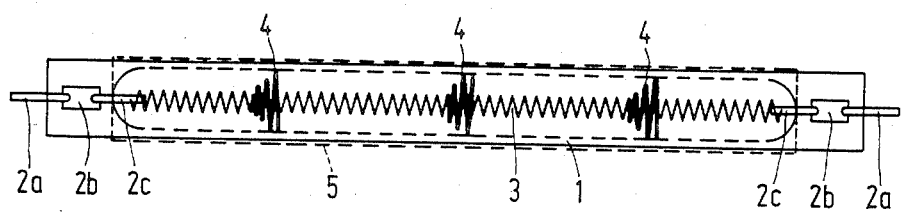
FIG. 1 is a side elevation of a lamp of the invention and
FIG. 2 is a graph of the reflection spectrum of an interference filter of the invention.

Niobium pentoxide has proved to be very suitable for use as a component of an interference filter directly on the wall of a lamp vessel of glass having a high $SiO_2$ content, such as quartz glass, because of its high physical and chemical stability even at high temperatures, such as, for example, 800° C. This holds both for incandescent lamps, more particularly halogen incandescent lamps having a filling of inert gas and hydrobromide, and for discharge lamps, such as high-pressure mercury discharge lamps which may contain metal halide in the gas filling. Discharge lamps may have around the lamp vessel a closed outer bulb which is evacuated or in which an inert gas (mixture) such as, for example, nitrogen is present.

After lamps according to the invention had been switched on and off repeatedly, no craquelé formation was observed in the interference filter. Apparently, niobium pentoxide does not or substantially not produce mechanical stresses in the filter. The remaining optical properties of the filter had also remained unchanged.

A favorable property of niobium pentoxide is that it has a low specific mass, as a result of which a comparatively small mass of the starting substance is required for the manufacture of a filter, and that starting material for preparing the substance is comparatively inexpensive. A very favourable property of niobium pentoxide is its comparatively high refractive index of about 2.35 as compared with 2.13 for tantalum pentoxide. As a result, in order to obtain a given transmission spectrum, a smaller number of layers is required with the use of $Nb_2O_5$ than with the use of $Ta_2O_5$. With the same number of layer pairs, $Nb_2O_5$ provides more abrupt transitions in the transmission spectrum from reflected to transmitted wavelengths. Thus, a lamp of high quality can be obtained with $Nb_2O_5$ at comparatively low cost.

The interference filter may be applied to the outer surface, to the inner surface or to the inner and the outer surface of the lamp vessel, for example in that alternately a gas mixture from which SiO$_2$ and Nb$_2$O$_5$, respectively, can be formed, is passed at increased temperature and at descreased pressure along the wall at the lamp vessel or of a body from which the lamp vessel is formed. Silicon dioxide may be applied, for example, from a mixture of silane and oxygen in nitrogen or from tetraethyl orthosilicate in nitrogen. Niobium pentoxide may be applied from a mixture of, for example, pentaethyl niobate and nitrogen.

An specific embodiment of a lamp according to the invention will now be described with reference to the drawing and to the following table.

The lamp shown in FIG. 1 has a tubular quartz glass lamp vessel 1. Current supply conductors 2a, 2b, 2c extend through the wall of this lamp vessel to a helically wound tungsten filament 3 which is arranged in the lamp vessel 1 and which is permanently centered in the lamp vessel by spiralized supports 4. The lamp vessel 1 is sealed in a vacuum-tight manner at the parts 2b of molybdenum foil. A molybdenum wire 2a and a tungsten wire 2c are welded to the foils 2b. The lamp vessel is filled with nitrogen, to which a few tenths of percent of hydrobromide are added. The outer side of the lamp vessel is provided with an interference filter 5 of alternating layers of SiO$_2$ and Nb$_2$O$_5$, which reflects infrared radiation back to the filament 3 and transmits visible radiation.

The composition of the filter is illustrated in the Table.

TABLE

| layer | material | thickness (nm.) | RWL* (nm.) |
|---|---|---|---|
| air | | | |
| 1 | Silicon dioxide | 98 | 575 |
| 2 | Niobium pentoxide | 113 | 1025 |
| 3 | Silicon dioxide | 354 | 2050 |
| 4 | Niobium pentoxide | 113 | 1025 |
| 5 | Silicon dioxide | 354 | 2050 |
| 6 | Niobium pentoxide | 113 | 1025 |
| 7 | Silicon dioxide | 354 | 2050 |
| 8 | Niobium pentoxide | 113 | 1025 |
| 9 | Silicon dioxide | 198 | 1150 |
| 10 | Niobium pentoxide | 127 | 1150 |
| 11 | Silicon dioxide | 198 | 1150 |
| 12 | Niobium pentoxide | 127 | 1150 |
| 13 | Silicon dioxide | 198 | 1150 |
| 14 | Niobium pentoxide | 127 | 1150 |
| 15 | Silicon dioxide | 198 | 1150 |
| 16 | Niobium pentoxide | 127 | 1150 |
| 17 | Silicon dioxide | 198 | 1150 |
| 18 | Niobium pentoxide | 127 | 1150 |
| 19 | Silicon dioxide | 176 | 1025 |
| 20 | Niobium pentoxide | 99 | 900 |
| 21 | Silicon dioxide | 155 | 900 |
| 22 | Niobium pentoxide | 99 | 900 |
| 23 | Silicon dioxide | 155 | 900 |
| 24 | Niobium pentoxide | 99 | 900 |
| 25 | Silicon dioxide | 155 | 900 |
| 26 | Niobium pentoxide | 99 | 900 |
| 27 | Silicon dioxide | 155 | 900 |
| 28 | Niobium pentoxide | 99 | 900 |

Substrate: quartz glass

*reference wavelength = the wavelength of radiation for which the layer has an optical thickness of one quarter of the wavelength.

Figure 2:
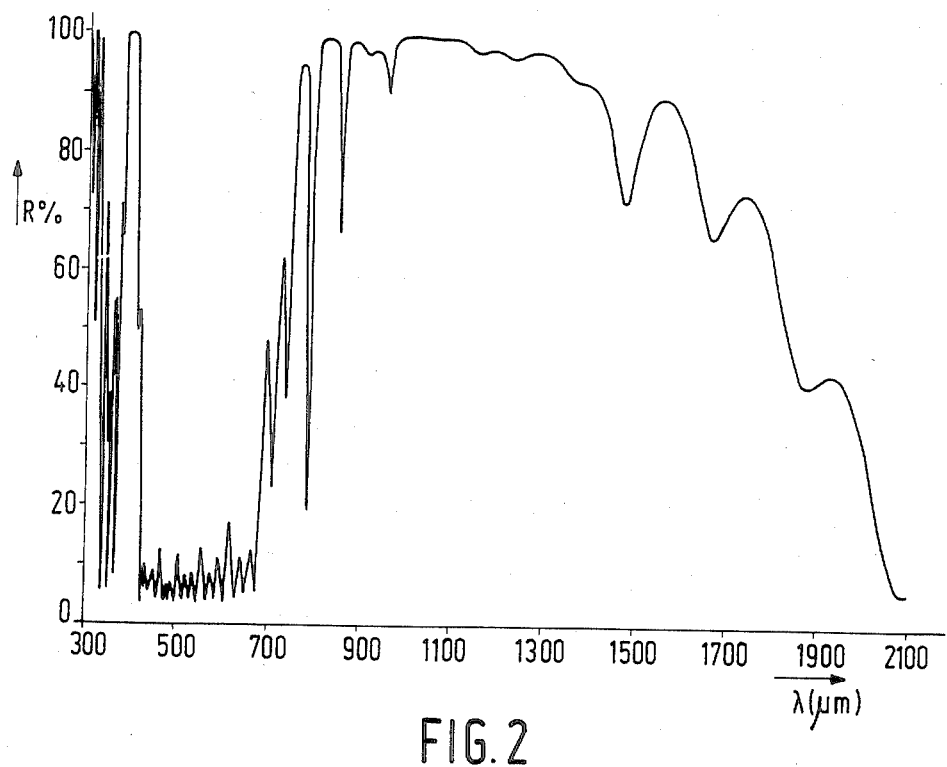

FIG. 2 shows the reflection spectrum of the interference filter of the Table. The filter has a very low reflection (high transmission) in the visible part and a very high reflection in the infrared part of the spectrum.

What is claimed is:

1. An electric lamp provided with a glass lamp vessel sealed in a vacuum-tight manner and having an SiO$_2$ content of at least 95% by weight, current supply conductors extending through the wall of the lamp vessel to an electric element arranged in the lamp vessel and an interference filter of alternating layers consisting essentially of SiO$_2$ and consisting essentially of niobium oxide provided on the glass lamp vessel.

2. The electric lamp of claim 1, wherein an interference filter is provided on the inner surface of the glass lamp vessel.

* * * * *

UNITED STATES PATENT AND TRADEMARK OFFICE
CERTIFICATE OF CORRECTION

PATENT NO.  : 4,734,614
DATED       : March 29, 1988
INVENTOR(S) : Gijsbert Kuus It is certified that error appears in the above-identified patent and that said Letters Patent is hereby corrected as shown below:

Column 4, Line 38  change "oxide" to "pentoxide"

Signed and Sealed this

Fifteenth Day of November, 1988

Attest:

DONALD J. QUIGG

Attesting Officer                Commissioner of Patents and Trademarks